(12) United States Patent
Price

(10) Patent No.: US 8,584,399 B2
(45) Date of Patent: Nov. 19, 2013

(54) HYBRID POLYURETHANE PLANTERS AND METHOD OF FORMING THEREOF

(75) Inventor: Frank Price, Mechanicsburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 1890 days.

(21) Appl. No.: 11/586,367

(22) Filed: Oct. 25, 2006

(65) Prior Publication Data

US 2007/0089364 A1    Apr. 26, 2007

Related U.S. Application Data

(60) Provisional application No. 60/730,432, filed on Oct. 26, 2005.

(51) Int. Cl.
*A01G 9/02*    (2006.01)

(52) U.S. Cl.
USPC .......................................... 47/65.7; 47/65.5

(58) Field of Classification Search
USPC .............. 47/65.5, 65.7, 66.6, 73, 79
See application file for complete search history.

(56) References Cited

U.S. PATENT DOCUMENTS

| | | | |
|---|---|---|---|
| 1,557,712 A | 10/1925 | Little | |
| 1,778,150 A | 10/1930 | Freeburg | |
| 2,738,621 A | 3/1956 | Abbrecht | |
| 2,785,508 A | 3/1957 | Coleman, Jr. | |
| 2,790,269 A | 4/1957 | Coleman, Jr. | |
| 3,079,037 A | 2/1963 | Schechter | |
| 3,104,498 A * | 9/1963 | Miller | 47/65.7 |
| 3,415,011 A | 12/1968 | Hornbostel, Jr. | |
| 3,704,545 A | 12/1972 | Van Reisen | |
| 3,961,443 A | 6/1976 | Insalaco | |
| 4,016,676 A * | 4/1977 | Bennick, Jr. | 47/65.7 |
| 4,047,329 A * | 9/1977 | Holt | 47/65.7 |
| 4,070,794 A | 1/1978 | Gibbs | |
| 4,145,841 A | 3/1979 | Woolpert | |
| 4,211,036 A * | 7/1980 | Dalitz | 47/65.7 |
| 4,369,598 A | 1/1983 | Beckwith | |
| 4,702,390 A * | 10/1987 | Rinkovsky, Sr. | 220/62.11 |
| 4,706,833 A | 11/1987 | Korcz et al. | |
| 4,791,754 A | 12/1988 | Demars, Jr. | |
| 4,835,834 A | 6/1989 | Weder | |
| 4,901,423 A | 2/1990 | Weder | |
| 4,980,209 A | 12/1990 | Hill | |
| 4,995,192 A | 2/1991 | DeWid | |
| 5,077,937 A | 1/1992 | Weder et al. | |
| 5,105,599 A | 4/1992 | Weder | |
| 5,142,817 A * | 9/1992 | Rolf | 47/32.5 |
| 5,184,390 A | 2/1993 | Weder | |

(Continued)

FOREIGN PATENT DOCUMENTS

DE    27 25 446 A1    6/1977
DE    3931 464 C1    9/1989

(Continued)

*Primary Examiner* — David Parsley
(74) *Attorney, Agent, or Firm* — Eckert Seamans Cherin & Mellott, LLC; David C. Jenkins

(57) ABSTRACT

A planter having a body with a base and a depending sidewall is disclosed. The body has at least three layers, an outer layer, a central layer, and an inner layer. The outer layer is a polyurethane foam. The central layer is fiberglass. The inner layer is polyester resin. A method of making the planter is further disclosed.

2 Claims, 2 Drawing Sheets

(56) References Cited

U.S. PATENT DOCUMENTS

| | | |
|---|---|---|
| 5,274,900 A | 1/1994 | Weder |
| 5,353,546 A | 10/1994 | Bock |
| 5,477,640 A | 12/1995 | Holtkamp, Jr. |
| 5,526,607 A * | 6/1996 | Roesch et al. ............ 47/65.7 |
| 5,535,548 A | 7/1996 | Weder et al. |
| 5,551,140 A | 9/1996 | Weder et al. |
| 5,561,894 A | 10/1996 | Weder et al. |
| 5,566,439 A | 10/1996 | Weder |
| 5,781,981 A | 7/1998 | Weder et al. |
| 5,782,453 A | 7/1998 | Tuzza et al. |
| 6,161,332 A | 12/2000 | Avot |
| 6,170,144 B1 | 1/2001 | Phillipson |

FOREIGN PATENT DOCUMENTS

| | | | |
|---|---|---|---|
| EP | 1 110 870 A1 | | 12/1999 |
| GE | 2 349 790 A | | 3/1999 |
| JP | 53-149544 | * | 12/1978 |
| JP | 2-135029 | * | 5/1990 |
| JP | 5-192042 | * | 8/1993 |

* cited by examiner

HYBRID POLYURETHANE PLANTERS AND METHOD OF FORMING THEREOF

CROSS REFERENCE TO RELATED APPLICATION

This application claims priority under 35 U.S.C. §119(e) to U.S. Provisional Patent Application Ser. No. 60/730,432, filed Oct. 26, 2005 entitled, HYBRID POLYURETHANE PLANTERS AND METHOD OF FORMING THEREOF.

BACKGROUND OF THE INVENTION

1. Field of the Invention

The present invention relates generally to an improved planter (a.k.a. flower pot) and a method for forming the planter, and more particularly to a three-layered planter having an outer layer of polyurethane, a central fiberglass layer, and an inner resin layer.

2. Background Information

Planters are common objects typically used for holding plants and the like for decorative reasons or other purposes. However, planters are often characterized by heavy weights and a fragile structure, making them both difficult and potentially dangerous to move. Further, formations of planters are generally made in a static mold, increasing the possibility of uneven dispersion of strength support across the planter.

There is, therefore, a need for an improved method of forming a planter.

There is a further need for a method of forming a planter having an outer layer of polyurethane, a central fiberglass layer, and an inner resin layer.

There is a further need for a planter having an outer layer of polyurethane, a central fiberglass layer, and an inner resin layer.

SUMMARY OF THE INVENTION

The present invention seeks to improve upon the deficiencies of prior art planters by providing a polyurethane planter having an outer polyurethane layer, a central fiberglass layer, and an inner resin layer. The planter is, preferably, formed by a method having the following five steps: 1) rotational foaming; 2) bonding; 3) sheeting; 4) resin catalization; and 5) de-molding.

BRIEF DESCRIPTION OF THE DRAWINGS

A full understanding of the invention can be gained from the following description of the preferred embodiments when read in conjunction with the accompanying drawings in which:

FIG. 1A is a detailed view of the layers of a planter.

DESCRIPTION OF THE PREFERRED EMBODIMENTS

Figure 1:
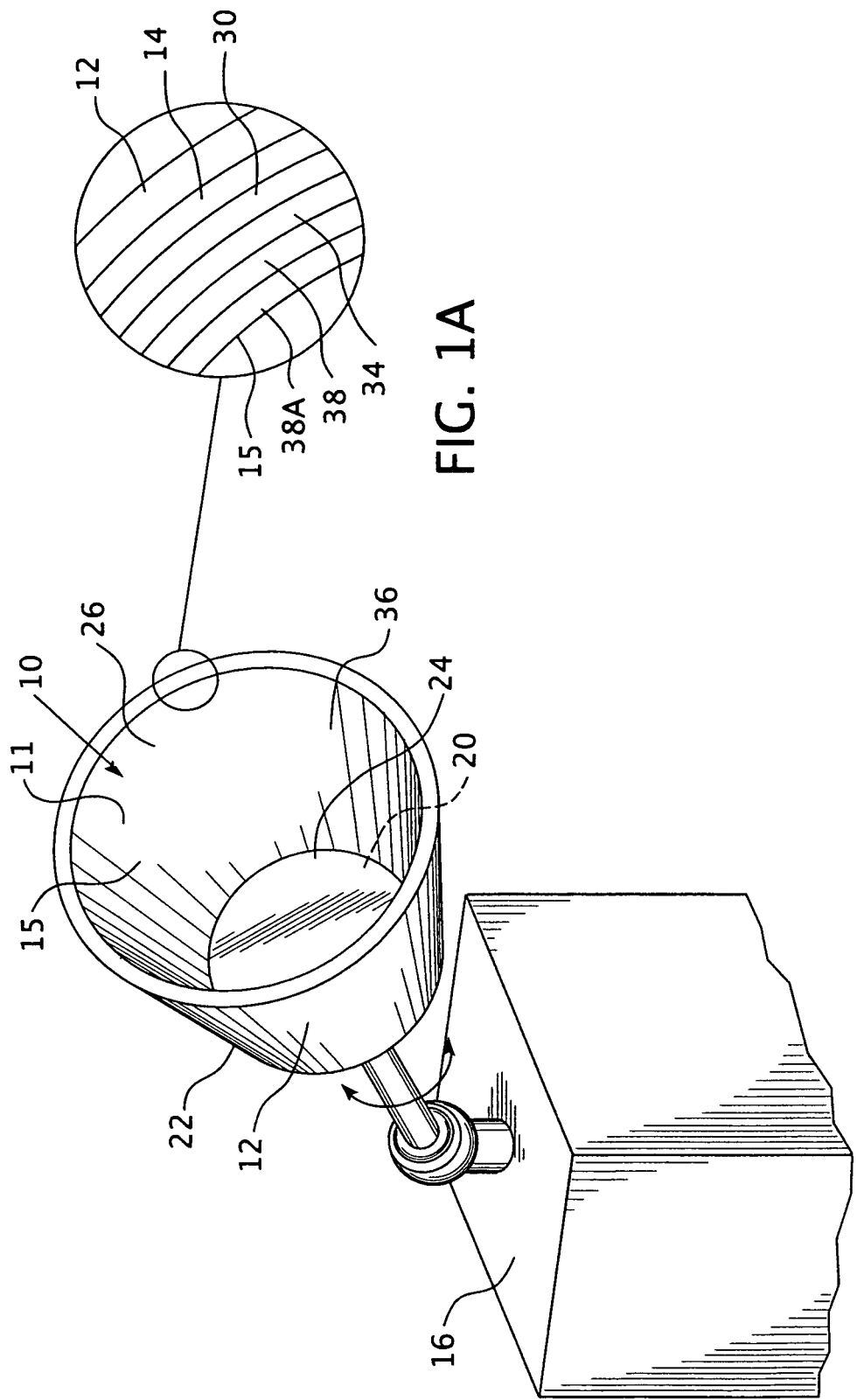
FIG. 1 is an isometric view of a planter and the molds used by the disclosed method.
Figure 2:
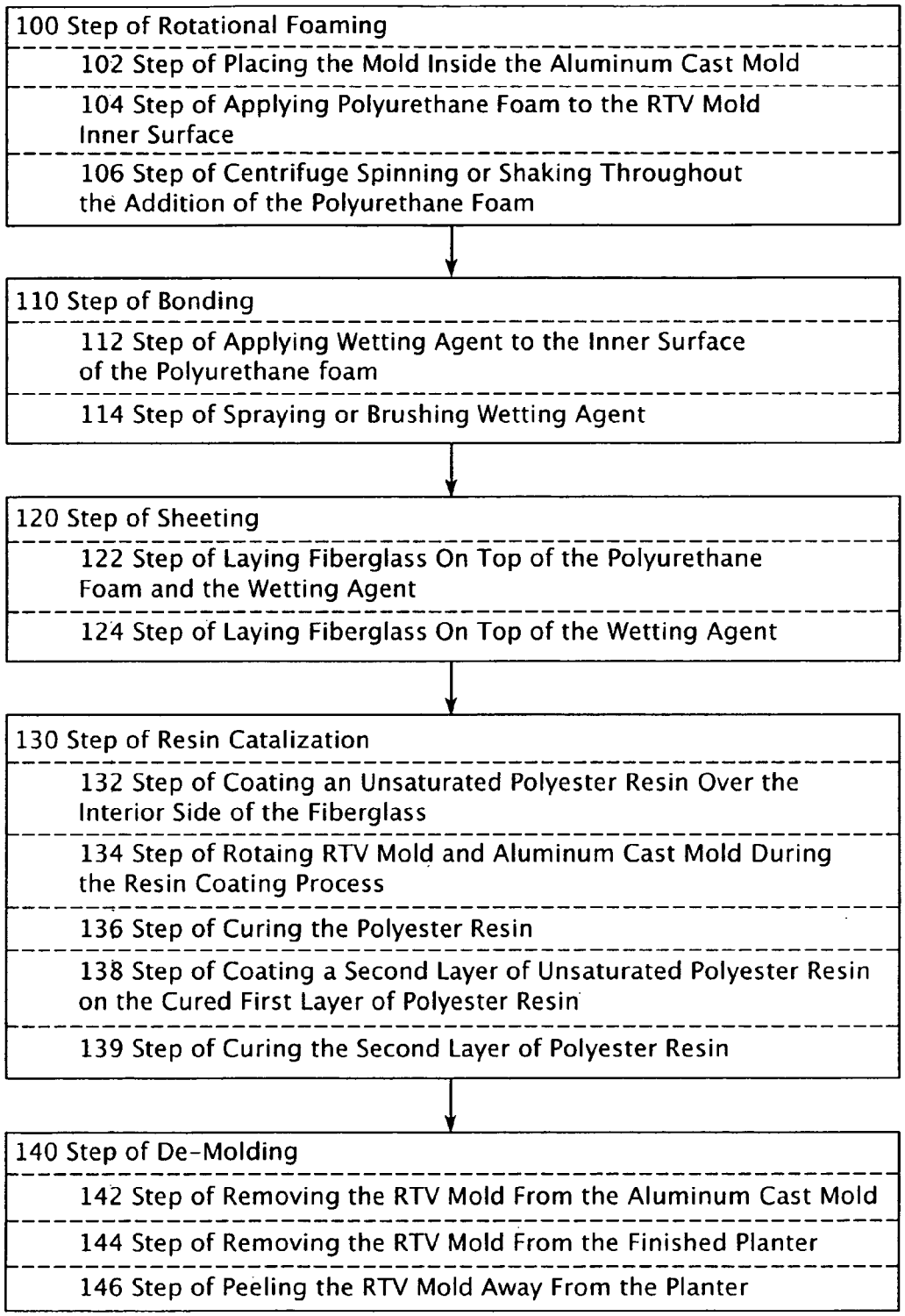
FIG. 2 is a flowchart of the disclosed method.

As shown in FIG. 1, a planter 10 is formed inside an aluminum cast mold 12 and a room temperature vulcanization (hereinafter "RTV") mold 14. The aluminum cast mold 12 is substantially rigid and does not typically deform during the method set forth below. The RTV mold 14 is substantially flexible and may be substantially deformed without damaging the RTV mold 14. The RTV mold 14 can be made from material typically known in the art, for example, silicone. The RTV mold 14 has an inner surface 15. The aluminum cast mold 12 is coupled to a centrifuge 16 or other like device. The type of centrifuge 16 utilized can vary within the spirit of the invention and can rotate and/or shake at various speeds. The planter 10 that results from this method has a body 11 corresponding to the shape of the aluminum cast mold 12 and the RTV mold 14. Accordingly, the aluminum cast mold 12 and the RTV mold 14, preferably, have a generally flat base 20 and an outwardly tapered sidewall 22. The base 20 may include grooves (not shown) or channels that will allow water to drain from underneath the completed planter 10. Thus, the planter body 11 also has a generally flat base 24 and an outwardly tapered sidewall 26. As set forth below, the planter 10 has an outer layer of polyurethane foam 30, a central layer of fiberglass 34, and an inner layer of polyester resin 38. The planter 10 is formed by performing the steps of rotational foaming 100, bonding 110, sheeting 120, resin catalization 130, and de-molding 140.

Initially, for the step of rotational foaming 100, the RTV mold 14 is placed 102 inside the aluminum cast mold 12. Polyurethane foam 30, or other like substance, is applied 104 to the RTV mold inner surface 15 while the centrifuge 16 is operational. The polyurethane foam 30 can be applied 104 either by hand or by automated means. The centrifuge 16 spins and/or shakes 106 throughout the addition of the polyurethane foam 30 and continues to spin 106 while the polyurethane foam 30 reacts and cures on the interior surface 15 of the RTV mold 14.

Once the polyurethane foam 30 is cured, the bonding step 110 occurs. The bonding step 110 occurs when a wetting agent 32 is applied 112 to the inner surface of the polyurethane foam 30. That is, the wetting agent 32 may be applied 112 onto the surface of the polyurethane by any means known in the art, such as spraying 114 or brushing 116. It is not necessary for the wetting agent 32 to cover the entirety of the exposed polyurethane foam layer 30, however, it is preferable.

Following the bonding step 110, the sheeting step 120 occurs. The sheeting step 120 includes laying 122 fiberglass 34 on top of the polyurethane foam 30 and the wetting agent 32 such that there are preferably no areas left uncovered by fiberglass 34. The fiberglass 34 is laid 122 onto the polyurethane foam 30 by any means known in the art, typically, by hand or machine. The fiberglass 34 is laid 122 in sheet 36 form within the RTV mold 14 so that the sheets 36 abut, that is, border or slightly overlap, each other. In an alternate embodiment, the bonding step 110 and sheeting step 120 may be combined/alternated. That is, the wetting agent 32 may be applied 112 to a segment of the polyurethane foam 30, and fiberglass 34 is thereafter laid 124 on top of the wetting agent 32 on the same segment. The alternating process, that is, bonding 110 then sheeting 120, is then repeated for any number of other segments on the polyurethane foam 30 until the polyurethane foam 30 is covered with both wetting agent 32 and fiberglass 34. In another embodiment, the application 112 of a wetting agent 32 on one or a multiplicity of segments of the polyurethane foam 30 can occur substantially simultaneous with the laying 122 of the fiberglass 34, provided that the fiberglass 34 is only added to segments of the polyurethane foam 30 that have already had the wetting agent 32 applied 112.

Once the polyurethane foam 30 is covered by fiberglass 34, the resin catalization step 130 occurs. That is, an unsaturated polyester resin 38 is coated 132 over the interior side of the fiberglass 34, preferably by brushing. To ensure an even coating of polyester resin, the RTV mold 14 and aluminum cast mold 12 are rotated 134 during the resin coating 132 process. The rotation 134 of the RTV mold 14 and aluminum cast mold 12 may be accomplished either mechanically or by hand. The rotation 134 can occur during or between applications of the polyester resin 38. The rotation 134 is preferably very slight, less than a full 360 degree turn of the RTV mold 14 and aluminum cast mold 12. The polyester resin 38 is then cured 136. Preferably, a second layer of unsaturated polyester resin 38A is thereafter coated 138 on the cured first layer of polyester resin 38. The rotation 134 of the RTV mold 14 and aluminum cast mold 12 may also occur during the second coating step 138. The second layer of polyester resin 38A is then cured 139.

The process of forming the planter 10 is finalized in the de-molding step 140. That is, the RTV mold 14, with the planter 10 inside, is removed 142 from the aluminum cast mold 12. The RTV mold 14 is removed 144 from the finished planter 10. Preferably, the removal 144 of the RTV mold 14 is accomplished by peeling 146 the RTV mold 14 away from the planter 10 in a single piece. The RTV mold 14 may be used again to make another planter 10. The planter 10 has an outer layer of polyurethane foam 30, a central layer of fiberglass 34, and an inner layer of polyester resin 38. Such a planter 10 is evenly formed and is lighter and stronger than typical planters.

While specific embodiments of the invention have been described in detail, it will be appreciated by those skilled in the art that various modifications and alternatives to those details could be developed in light of the overall teachings of the disclosure. For example, it will be appreciated that various sized, shaped or colored planters can be formed under the present invention with minimal adjustment. Accordingly, the particular arrangements disclosed are meant to be illustrative only and not limiting as to the scope of the invention.

What is claimed is:

1. A planter comprising:
   a body having a base and a depending sidewall, said body having at least three layers, an outer layer, a central layer, and an inner layer;
   said outer layer being polyurethane foam;
   said central layer being fiberglass, said fiberglass bonded to said polyurethane foam; and
   said inner layer being polyester resin, said polyester resin applied to, and cured upon, said fiberglass.
2. The planter of claim 1 wherein said body further includes a layer of wetting agent disposed between said polyurethane foam and said fiberglass.

* * * * *